(12) United States Patent
Witkowski (10) Patent No.: US 6,370,524 B1
(45) Date of Patent: Apr. 9, 2002

(54) SYSTEM AND METHOD FOR PROCESSING QUERIES HAVING AN INNER QUERY BLOCK CONTAINING A GROUPING OPERATOR

(75) Inventor: Andrew Witkowski, Foster City, CA (US)

(73) Assignee: Oracle Corp., Redwood Shores, CA ( * ) Notice: Subject to any disclaimer, the term of this patent is extended or adjusted under 35 U.S.C. 154(b) by 0 days.

(21) Appl. No.: 09/283,755

(22) Filed: Apr. 2, 1999

(51) Int. Cl.[7] .............................................. G06F 17/30
(52) U.S. Cl. .................................. 707/3; 707/4; 707/2
(58) Field of Search ........................................ 907/1–10

(56) References Cited

U.S. PATENT DOCUMENTS

| | | | | |
|---|---|---|---|---|
| 5,367,675 A | * | 11/1994 | Cheng et al. .................. | 707/2 |
| 5,412,804 A | * | 5/1995 | Krishna .......................... | 707/2 |
| 5,548,758 A | * | 8/1996 | Pirahesh et al. ............... | 707/2 |
| 5,598,559 A | * | 1/1997 | Chaudhuri ...................... | 707/2 |
| 5,761,657 A | * | 6/1998 | Hoang ............................ | 707/4 |
| 5,875,447 A | * | 2/1999 | Goel et al. ..................... | 707/4 |
| 5,978,792 A | * | 11/1999 | Bhargava et al. .............. | 707/2 |
| 6,032,144 A | * | 2/2000 | Srivastava et al. ............ | 707/3 |

* cited by examiner

*Primary Examiner*—Hosain T. Alam
*Assistant Examiner*—Anh Ly
(74) *Attorney, Agent, or Firm*—Ditthavong & Carlson, P.C (57) ABSTRACT

Queries having a outer query block enclosing an inner query block, such as a reference to a view or a subquery, with a grouping operator, such as GROUP or DISTINCT, are transformed by merging the inner query block into the outer query block. The FROM clause of the transformed query includes the tables referenced in the FROM clauses of the outer query block and the inner query block. A new GROUP BY clause is created for the outer query block that contains the rowids of tables referenced in the FROM list of the original query and the expressions in the GROUP BY clause of the inner query block. The outer query block can be split if the outer query block also contains a GROUP BY or HAVING clause.

30 Claims, 6 Drawing Sheets

| CUSTOMERS TABLE 600 | | |
|---|---|---|
| CID | ZIP | ... |
| 2 | 19555 | ... |
| 3 | 19672 | ... |
| 4 | 19545 | ... |
| 5 | 19021 | ... |
| 6 | 19260 | ... |

| ORDERS TABLE 620 | | | |
|---|---|---|---|
| OID | CID | PRICE | ... |
| 1 | 2 | 25 | ... |
| 2 | 4 | 10 | ... |
| 3 | 6 | 15 | ... |
| 4 | 2 | 20 | ... |
| 6 | 3 | 35 | ... |

FIG. 6(a)

| VIEW V 640 | |
|---|---|
| CID | SALES |
| 2 | 45 |
| 3 | 35 |
| 4 | 10 |
| 6 | 15 |

FIG. 6(b)

SYSTEM AND METHOD FOR PROCESSING QUERIES HAVING AN INNER QUERY BLOCK CONTAINING A GROUPING OPERATOR

FIELD OF THE INVENTION

The present invention relates to computer database systems and more particularly to processing embedded queries containing a grouping operator.

BACKGROUND OF THE INVENTION

Figure 6A:
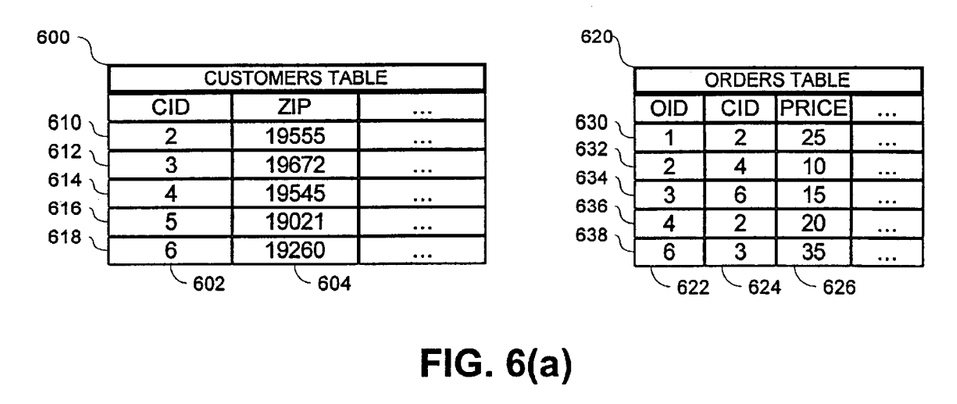
FIG. 6(a) depicts an exemplary database.

Relational databases store information in collections of tables, in which each table is organized into rows and columns. FIG. 6(a) illustrates an exemplary database containing two tables, customers table 600 and orders table 620, that is useful in recording information about a sales operation. The columns of customers table 600 hold attributes for customers, for example, a customer identifier CID 602, an a zip code ZIP 604, and each row 610–618 is an entry for a respective customer. For example, row 610 is an entry for customer with a CID of 2 and a ZIP of 19555. The orders table 620 holds information in columns for the orders that the customers place. Such information may include, for example, an order identifier OID 622, the customer identifier CID 624 of the customer placing the order, and a dollar amount PRICE 626.

A user retrieves information from the tables of a relational database by entering input that is converted to queries by a database application. The database application submits the queries to a database server. In response to receiving a query, the database server accesses the tables specified in the query to determine which information within the tables satisfies the query. The information that satisfies the queries is then retrieved by the database server and transmitted to the database application and ultimately to the user. Database servers are also capable of combining or "aggregating" information contained in the tables in response to a query. For example, a common query in the exemplary database is to total all the order amounts to compute a sales figure for the customers in a given ZIP code.

Figure 6B:
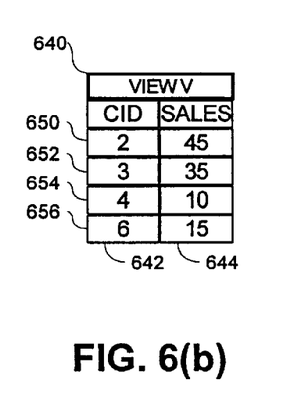
FIG. 6(b) depicts an exemplary view.

For any given database application, the queries must conform to the rules of a particular query language. Most query languages provide users with a variety of ways to specify information to be retrieved. For example, in the Structured Query Language (SQL), the following query requests the retrieval of sales information for customers in zip code 19555 by adding up the order amounts:

select v.CID, v.SALES
from CUSTOMERS,
  (select CID, sum(PRICE) as SALES
  from ORDERS
  group by CID) v
where CUSTOMERS.CID=V.CID and ZIP=19555;

This query actually contains two queries, one of which is embedded in the other. The inner query is in the form of a view definition, and the view thus defined is referenced by the name "v". In this example, the view v requests the database server to group all the rows in orders table 620 by the customer identifier CID 622 and sum all the values of the PRICE column 626 as a SALES figure for each group of rows. Referring to FIG. 6(b), view v 640 therefore contains two columns, CID 642 for the customer identifier and SALES 644 for the aggregate sales figure as a sum of the PRICE column 626 values for each of the groups of rows.

The outer query requests the database server to select those sales figures 644 of view v 640 in which the customer identifier CID 602 matches the view CID 642 and the zip code ZIP 604 of the customer is 19555. In the example, the outer query selects a customer identifier CID of 2 and a sales figure of 45 from row 650 of view v 640, because row 610, with a CID 602 of 2 and a ZIP 604 of 19555, satisfies the conditions of the WHERE clause.

This kind of query, which embeds an inner query with a grouping function, is fairly common in database applications because it is straightforward for users to write and understand. Executing this query in a straightforward manner, however, by first evaluating the view defined by the inner query and then evaluating the outer query, may not be scalable for tables containing a very large number of rows. Evaluating the view first results in performing a fill table scan of the table referenced in the FROM list of the inner query (the "inner" table). In some environments, there can be millions of rows in the inner table, even though the outer query only selects a few rows of the inner table. Consequently, in such conventional approaches, the database server performs much unnecessary work in aggregating columns for the rows of the inner table that will never be selected by the outer query. As the number of rows in the inner table greatly increase, the performance of the processing this kind of query is substantially degraded. Therefore, it is desirable to process this type of query more efficiently.

One approach for optimizing this kind of query involves the use of a "magic set transformation." In a magic set transformation, a new, innermost query block is introduced into the inner query block to first select an appropriate subset of the data. In the example, a magic set transformation results in the following query, with the magic set query block labeled "magic" and a predicate referencing the magic set marked in bold:

select v.CID, V.SALES
from CUSTOMERS,
  (select CID, sum(PRICE) as SALES
  from ORDERS,
    (select CID from CUSTOMERS
    where ZIP=19555) magic
  where ORDERS.CID=magic.CID
  group by CID) v
where CUSTOMERS.CID=v.CID and ZIP=19555;

Accordingly, when this transformed query is processed, the magic set query is evaluated first, selecting only one CID from customers table 600. In turn, this single CID selects only two rows 630 and 636 from the order tables 620 for view v, whose sales column is a summation of the price column 626 for aggregated rows. Consequently, a magic set transformation, which introduces an artificial entity that duplicates the outer table customers 600, is capable of reducing the amount of processing involved in grouping over the orders table 620.

Although the magic set transformation may be acceptable when the queries are very simple, e.g., involving only two tables, a disadvantage with the magic set transformation is particularly apparent when there is a much larger number of tables referenced in the outer query block and the inner query block. It is known that the performance of a join operation of multiple tables is highly dependent on the particular order in which the tables are joined. As a result, techniques have been developed in choosing an efficient join order, and generally these techniques are most effective when there are more options to consider, i.e., more tables to choose from.

The magic set transformation, however, reduces the number of options that are available for such techniques for choosing an efficient join order. For example, the magic set transformation maintains the separation of the inner tables of the inner query block from the outer tables of the outer query block, even though there may be a more efficient join order involving a combination of the inner tables and the outer tables.

SUMMARY OF THE INVENTION

Therefore, there is a need for a method of transforming a query containing an embedded query with a grouping operator that reduces the amount of processing to execute the entire query. There is also a need for a method of improving the processing time of such embedded queries that does not foreclose possible join orderings from consideration and, desirably, increases the number of possible join orderings. These and other needs are addressed by a query transformation that merges the embedded inner query block into the outer query block. By merging the embedded query, no particular join sub-ordering is dictated and inner tables are capable of being combined with the outer tables to form a efficient join ordering.

One aspect of the invention is a computer-implemented method and a computer-readable medium bearing instructions for processing a query in a database system by receiving an original query that contains an inner query block with a grouping operator such as GROUP BY or DISTINCT in SQL. The inner query block is embedded in an outer query block, for example, as a reference to a view or as a subquery. The original query is transformed into a transformed query by removing the inner query block from the original query and merging portions of the inner query block into the outer query block. The transformed query is then processed. Preferably, the transformed query is semantically equivalent to the original query, but includes the tables referenced in a FROM clause of the inner query block in a FROM clause of the outer query block.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and apparatus for processing queries is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Hardware Overview

Figure 1:
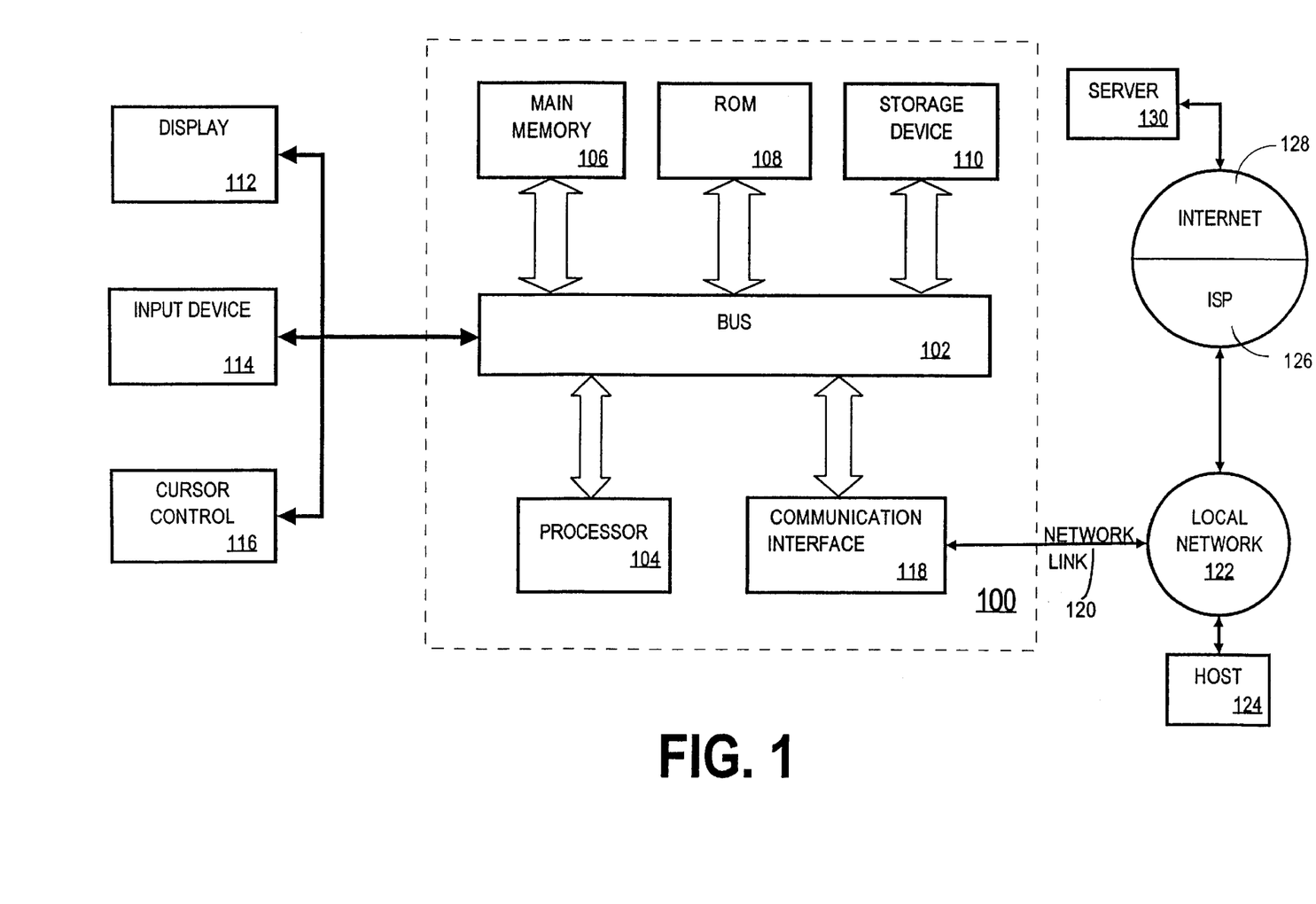
FIG. 1 depicts a computer system that can be used to implement the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic tape drive, a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for efficiently retrieving values from an index. According to one embodiment of the invention, efficiently retrieving values from an index is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through a worldwide packet data communication network 128, such as the "Internet." Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for efficiently retrieving values from an index as described herein.

The received code may be executed by processor 104 as it is received, and/or stored in storage device 110, or other non-volatile storage for later execution. In this manner, computer system 100 may obtain application code in the form of a carrier wave.

Merge Transformations

Figure 2:
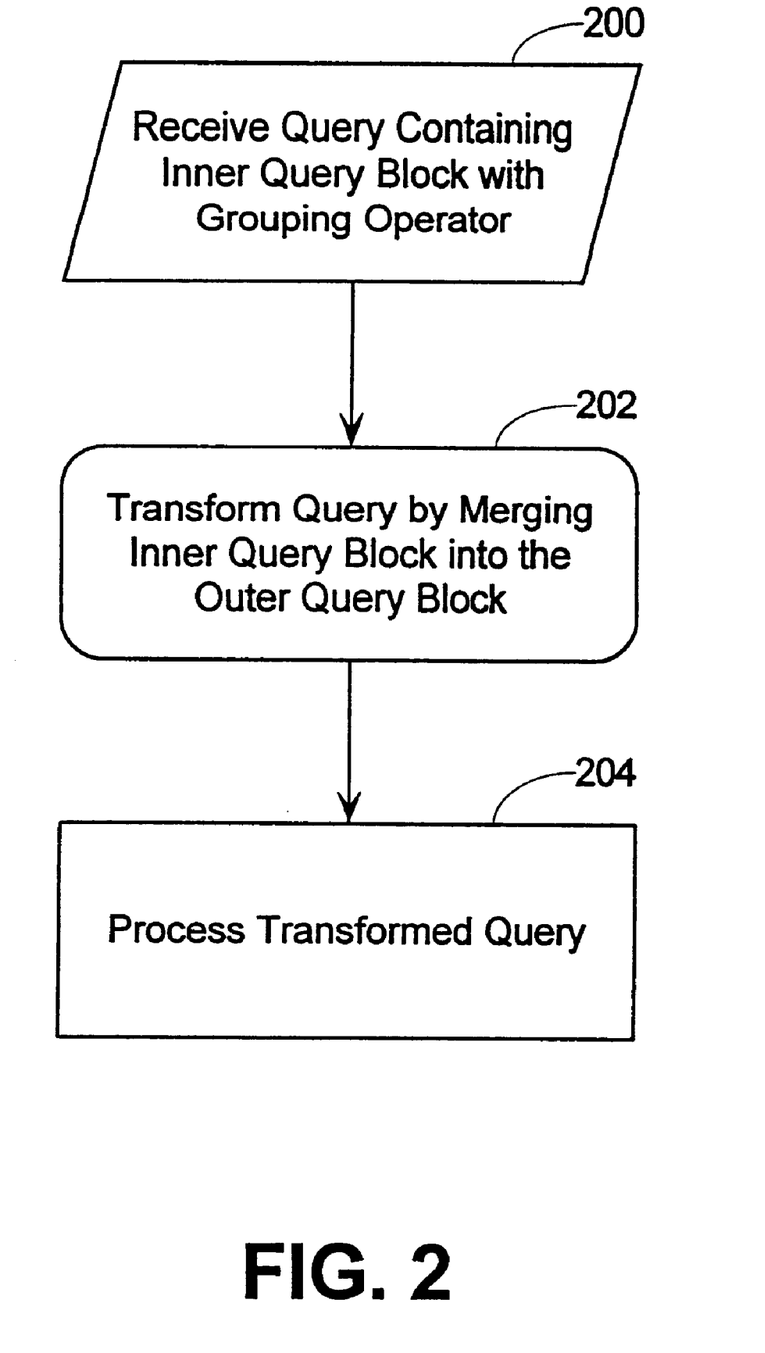
FIG. 2 is a flowchart illustrating the operation of processing queries having an inner query block containing a grouping operator according to an embodiment.

Techniques are described herein for transforming an original query into a semantically equivalent transformed query by merging. The transformed query produced by the merging can be processed more efficiently than the original query. A transformed query is said to be semantically equivalent to an original query if processing the transformed query results in retrieving the same information as processing in the original query. Referring to FIG. 2, the original query containing an embedded query with a grouping operator is received by a database server (step 200). This query can be submitted to a database server from user input, a stored procedure, and the like.

At step 202, the original query is transformed by merging the embedded query with a grouping operator into the referencing query that enclosed the embedded query. Various transformations that merge embedded queries with a grouping operator into a referencing query are described in more detail hereinafter with reference to FIGS. 3 and 4. The grouping operator typically includes the GROUP BY operator and the DISTINCT qualifier as defined by SQL, but the present invention is not limited to any particular grouping operator in any particular query language. The embedded query is referred to herein as the "inner query block," and may be in the form of a view or a subquery. The portions of the referencing query that do not belong to the inner query block is referred to herein as the "outer query block."

Merging portions of the inner query block into the outer query block allows for substantial performance improvements during execution, without using a magic set transformation, because tables referenced in the inner query block and the outer query block are combined in the same FROM clause and can be considered together in determining a join order. For example, the CUSTOMERS and ORDER tables are separated in the following original query:

select v.CID, v.SALES
from CUSTOMERS,

```
(select CID, avg(PRICE) as SALES from ORDERS
    group by CID) v
where CUSTOMERS.CID=v.CID and ZIP=19555;
```

However, in the following, semantically equivalent, merged query, the CUSTOMERS table and the ORDERS table are found in the same FROM clause and can be considered together for determining an efficient a join order and access path:

```
select ORDERS.CID, avg(PRICE) as SALES
from CUSTOMERS, ORDERS
where CUSTOMERS.CID=ORDERS.CID and ZIP=
    19555
group by ORDERS.CID, CUSTOMERS.rowid;
```

If there is an index on column ORDERS.CID and if the predicate CUSTOMERS.ZIP=19555 is selective, then a good access plan for the merged query would first evaluate the CUSTOMERS.ZIP=19555 predicate and then perform a join of CUSTOMERS and ORDER, using the index on column ORDERS.CID. Since CUSTOMERS is restricted by the condition CUSTOMERS.ZIP=19555, the join would likely result in retrieval of only a small subset of ORDERS, resulting in a significant I/O savings in accessing the table data as compared to executing the original query and computing the entire view v.

After the query has been transformed, the transformed query is executed according to one embodiment of the invention (step 206) to retrieve the requested information. In another embodiment of the invention, a cost is computed for executing the original query and for executing the transformed query, and the query with the lower cost is executed, thereby only executing the transformed queries when they actually improve performance. Various cost metrics, such as estimating the amount of disk I/O used in executing the query, may be employed, and the present invention is not limited to the use of any particular cost metric.

Merging Embedded Views With Group-BY

Figure 3:
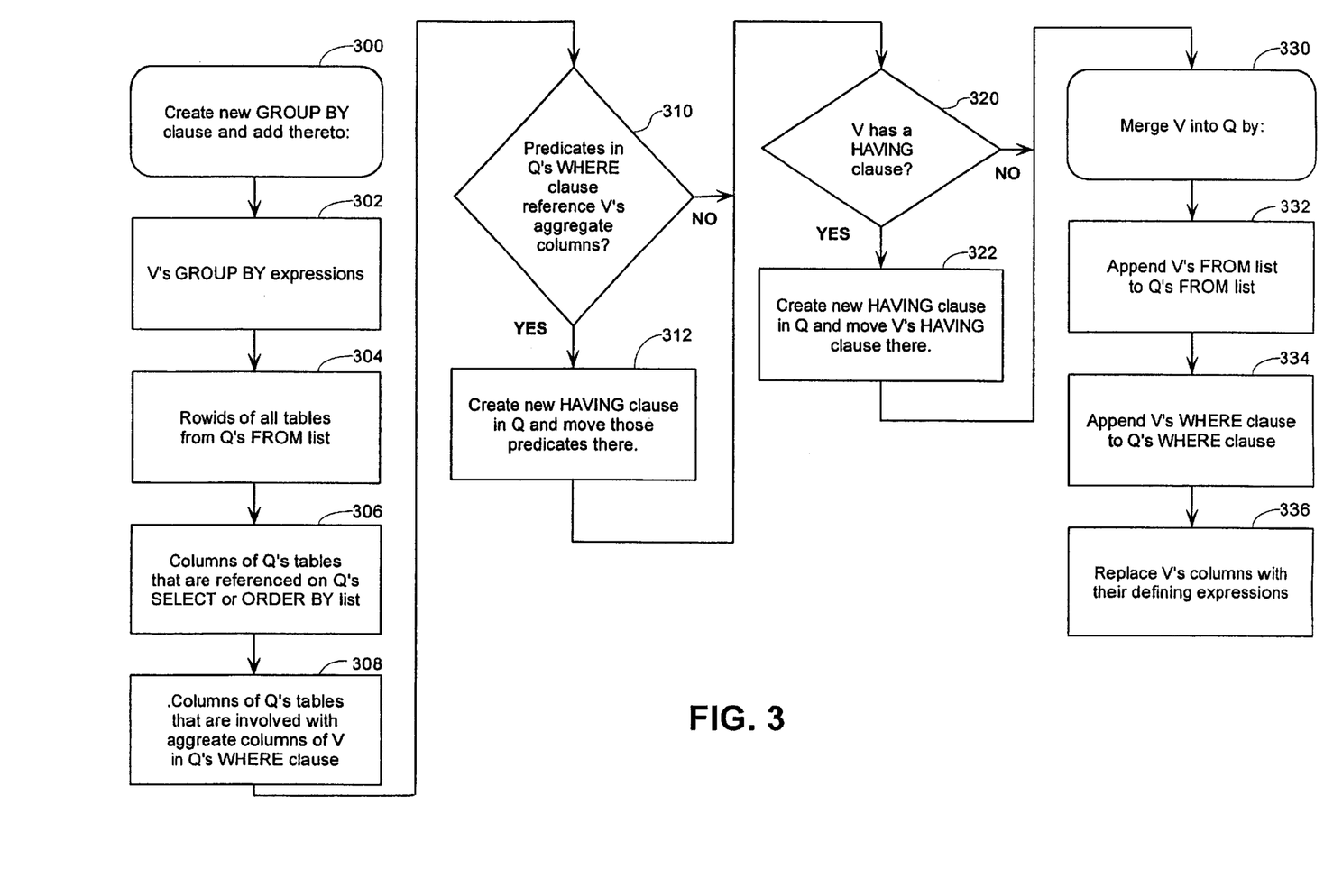
FIG. 3 is a flowchart illustrating the operation of a transformation for merging an inner query block with a GROUP BY operator into an outer query block according to an embodiment.

Although the present invention is not limited to any particular means by which the transformation is achieved, one way to transform a query containing an inner query block with a grouping operator according to an embodiment is depicted in FIG. 3. In particular, this transformation relates to transforming a nested query with a reference to a view as the inner query block and GROUP BY as the grouping operator, but without a GROUP BY clause, a HAVING clause, or an aggregate function in the outer query block. The operation of this embodiment will be illustrated with respect to the following query as a working example:

```
select v.CID, v.SALES
from CUSTOMERS,
    (select CID, avg(PRICE) as SALES from ORDERS
        group by CID) v
where CUSTOMERS.CID=v.CID and ZIP=19555;
```

The steps described herein involve inserting, modifying, and removing expressions, columns references, and other elements within a query. These operations may be performed in various ways, for example, by manipulating nodes of a parse tree representation of the query and pointers to the nodes, but the present invention is not limited to any particular manipulation of any particular internal representation. At step 300, a new, outer query block GROUP BY clause (marked in bold) is created for the outer query block for adding column references, as follows:

```
select v.CID, v.SALES
from CUSTOMERS,
    (select CID, avg(PRICE) as SALES from ORDERS
        group by CID) v
where CUSTOMERS.CID=v.CID and ZIP=19555
group by;
```

In step 302, the column references in the GROUP BY clause of the inner query block are added. In the example, since view v groups by column ORDERS.CID, ORDERS.CID is added to the outer query block GROUP BY clause, as follows:

```
select v.CID, v.SALES
from CUSTOMERS,
    (select CID, avg(PRICE) as SALES from ORDERS
        group by CID) v
where CUSTOMERS.CID =v.CID and ZIP=19555
group by ORDERS.CID;
```

In step 304, the rowids of all tables from the outer query block's FROM list ("outer tables") are also added to the outer query block GROUP BY clause. A table's rowid is a pseudo-column reference that is retrievable by query and uniquely identifies a row in the table but is not normally displayed when the structure of the table is listed. A purpose for inserting the rowids of the outer tables to the outer query block GROUP BY clause is to avoid commingling values for different rows in the CUSTOMERS table when the same CUSTOMERS.CID value is stored in multiple rows and chosen by the selection criteria. A result of step 304 is illustrated as follows:

```
select v.CID, v.SALES
from CUSTOMERS,
    (select CID, avg(PRICE) as SALES from ORDERS
        group by CID) v
where CUSTOMERS.CID=v.CID and ZIP=19555
group by ORDERS.CID, CUSTOMERS.rowid;
```

In steps 306 and 308, columns of the outer tables that are referenced in the outer query block SELECT or ORDER BY list (step 306) or involved with aggregate columns of the inner query block in outer query block WHERE clause (step 308) are also inserted into the outer query block GROUP BY clause. These cases do not appear in the working example, but would occur, if, for example, the outer query block WHERE clause included a predicate that references the SALES results. The condition of step 308, whether the predicate of the outer query block WHERE clause references the inner query block's aggregate column, is also explicitly checked in step 310. In the working example, this condition is not satisfied, thereby causing execution to skip to step 320. If, on the other hand, the condition holds, then a new HAVING clause is created for the outer query block and inserted with those WHERE clause predicates (step 312). In either case, execution proceeds to step 320.

In step 320, the condition whether the inner query block has a HAVING clause is checked. If this condition is satisfied, then a new HAVING clause is created for the outer query block, if it does not already exists, and the inner query block HAVING clause predicates are moved thereto (step 322). For the working example, which lacks a HAVING clause in the embedded view, this step is skipped and execution proceeds to step 330.

In step 330, the modified query is now ready for a select-project-join merge operation (SPJ merge), which ultimately allows for the inner tables to be on the same FROM list as the outer tables. At step 332, the SPJ merge is performed by appending the inner tables, which are referenced in the view's FROM list, to the FROM list of the outer query block. In the working example, the inner table ORDERS is added to the outer query block's FROM list, as follows:

```
select v.CID, v.SALES
from CUSTOMERS, ORDERS,
    (select CID, avg(PRICE) as SALES from ORDERS
        group by CID) v
where CUSTOMERS.CID=v.CID and ZIP=19555
group by ORDERS.CID, CUSTOMERS.rowid;
```

In step 334, the predicates of the inner query block WHERE clause are added to the outer query block WHERE clause. In the working example, however, there are no inner query block WHERE clause predicates. In step 336, the view is removed from the outer query block and the view's columns are replaced by their defining expressions. In the working example, v.CID is explicitly replaced by ORDERS.CID, but PRICE need not be replaced by ORDERS.PRICE since the column unambiguously but implicitly references that column of the ORDERS table. A result of step 336, and indeed of the transformation process according to this embodiment, is a transformed query illustrated as follows:

```
select ORDERS.CID, avg(PRICE) as SALES
from CUSTOMERS, ORDERS
where CUSTOMERS.CID=ORDERS.CID and ZIP=19555
group by ORDERS.CID, CUSTOMERS.rowid;
```

According to the transformed query, rows 630 and 636 in the ORDERS table 620 having a CID of 2 are grouped, because row 610 of CUSTOMER table 600 has a CID 602 of 2 and a ZIP 604 of 19555. Grouping rows 630 and 636 of the ORDERS table 620 and summing the PRICE column 626 thereof, results in a SALES of 25+20=45. Since the same results are generated by the transformed query as the original query, the transformed query is semantically equivalent to the original query. Moreover, the FROM clause of the transformed query lists all the tables from both the outer query block (e.g. CUSTOMERS) and the inner query block (e.g. ORDERS), thereby allowing a efficient join order to be found.

Merging With GROUP BY In Outer Query Blocks

The merging technique depicted in FIG. 3 is applicable to transforming a nested query that contains a reference to a view as the inner query block and GROUP BY as the grouping operator but does not contain a GROUP BY clause, a HAVING clause, or an aggregate function in the outer query block. Various techniques may be used to manipulate nested queries with a GROUP BY clause, a HAVING clause, or an aggregate function in the outer query block in a way that allows the merging technique depicted in FIG. 3 to be used on them.

In one embodiment, when the outer query block does indeed contain a GROUP BY clause, a HAVING clause, or an aggregate function, the outer query block is split into a first outer query block and a second outer query block. The first outer query block encloses the second outer query block and contains the GROUP BY clause, the HAVING clause, and the aggregate function of the original outer query block. Since, as a result, the second (enclosed) outer query block does not contain the GROUP BY clause, the HAVING clause, or the aggregate function of the original outer query block but still contains the inner query block, the steps depicted in FIG. 3 are therefore applicable to merging the inner query block into the second outer query block.

Figure 4:
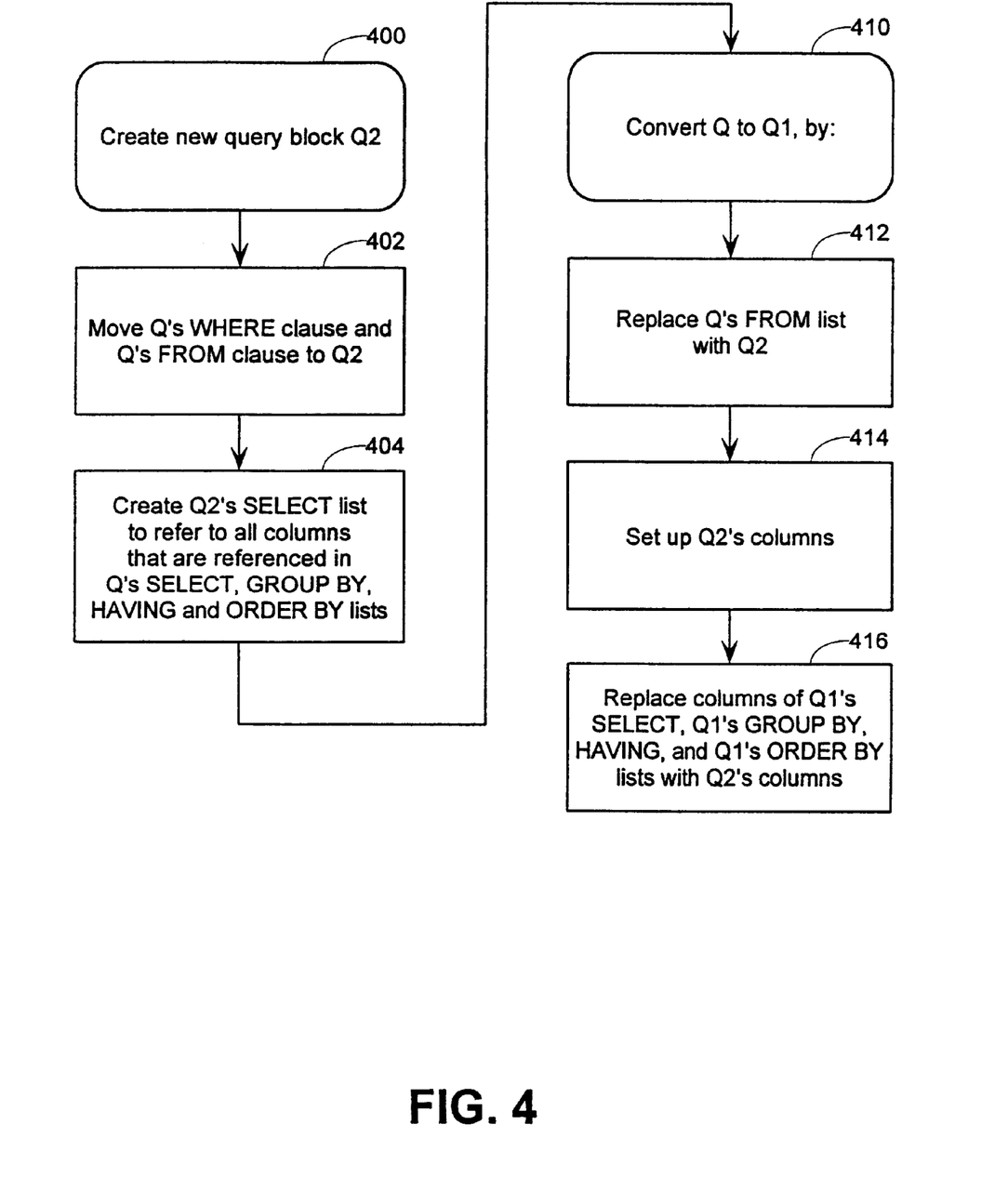
FIG. 4 is a flowchart illustrating the operation of splitting an outer query block for merging an inner query block according to an embodiment.

FIG. 4 illustrates one method of splitting an outer query block as a preliminary step before employing the merging technique of FIG. 3. Accordingly, a new query block Q2 is created (step 400). Portions of the original outer query block Q are moved into new query block Q2 (steps 402), and the original outer query block Q is converted into a first outer query block Q1 enclosing a second outer query block Q2 (steps 410–418). The operation of this method will be illustrated in TABLE 1, TABLE 2, and TABLE 3 with respect to the following nested query as a working example:

```
select r11.x, avg(r21_aggr_y*r21_aggr_y+1)
from r11,
    (select r21.x as r21_x, avg(r21.y) as r21_aggr_y
        from r21 group by r21.x) v
where r11.x=r21_x and r11.y<10
group by r11.x
having avg(r21_aggr_y)>1;
```

In step 400, a new query block Q2 is created that will ultimately become the embedded second outer query block. The new query block Q2 is augmented by moving portions of the original outer query block Q into the new query block Q2. Specifically, the WHERE clause and the FROM clause of the outer query block Q is moved into the new query block Q2 (step 402). In the exemplary query illustrated in TABLE 1, the new query block Q2 thus contains a FROM clause of "from r11, v" and a WHERE clause of "where r11.x=r21_x and r11.y<10"

TABLE 1

| Step | Q | Q2 |
|---|---|---|
| 400 | select r11.x,<br>    avg (r21_aggr_y*<br>    r21_aggr_y+1)<br>from r11,<br>    (select r21.x as r21_x,<br>        avg (r21.y) as<br>        r21_aggr_y<br>        from r21 group by<br>        r21.x) v<br>where r11.x=r21_x and<br>r11.y<10<br>group by r11.x<br>having avg<br>(r21_aggr_y)>1; | select; |
| 402 | select r11.x,<br>    avg (r21_aggr_y*<br>    r21_aggr_y+1)<br><br>group by r11.x<br>having avg<br>(r21_aggr_y)>1; | select<br>from r11,<br>    (select r21.x as r21_x,<br>        avg (r21.y) as r21_aggr_y<br>        from r21 group by r21.x) v<br>where r11.x=r21_x and<br>r11.y<10; |
| 404 | select r11.x,<br>    avg (r21_aggr_y*<br>    r21_aggr_y+1)<br><br><br>group by r11.x<br>having avg<br>(r21_aggr_y)>1; | select r11.x, r21_aggr_y<br>from r11,<br>    (select r21.x as r21_x,<br>        avg (r21.y) as r21_aggr_y<br>        from r21 group by r21.x) v<br>where r11.x=r21_x and<br>r11.y<10; |

In step 404, the SELECT list of the new query block Q2 is created to refer to all the columns referenced in the SELECT, GROUP BY, HAVING ORDER BY lists of outer query block Q. Duplicate columns in the SELECT list of the new query block Q2, however, are not generated. Referring to TABLE 1, the SELECT list of the new query block Q2 refers to column r11.x because it is found in Q's SELECT and GROUP BY lists, and to r21_aggr_y because it is mentioned in Q's SELECT and HAVING lists.

After the new query block Q2 is prepared, it is ready to be inserted into the outer query block Q to produce a first outer query block Q1 enclosing a second outer query block Q2 (step 410). Referring to FIG. 4 and TABLE 2, the new query block Q2 is inserted into the outer query block Q to produce the first outer query block Q1 by replacing the FROM list of the outer query block Q with the second outer query block Q2 as an embedded view (step 412). In the working example illustrated in TABLE 2 at step 412, the second outer query block Q2 is marked in bold.

TABLE 2

| Step | Q1 and Q2 |
|---|---|
| 412 | select r11.x, avg(r21_aggr_y*r21_aggr_y+1)<br>from (select r11.x, r21_aggr_y<br>  from r11, (select r21.x as r21_x,<br>    avg(r21.y) as r21_aggr_y<br>    from r21 group by r21.x) v<br>  where r11.x=r21_x and r11.y<10) Q2<br>group by r11.x<br>having avg(r21 aggr y)>1; |
| 414 | select r11.x, avg(r21_aggr_y*r21_aggr_y+1)<br>from (select r11.x as r11_x, r21_aggr_y as r21_aggr_y<br>  from r11, (select r21.x as r21_x,<br>    avg(r21.y) as r21_aggr_y<br>    from r21 group by r21.x) v<br>  where r11.x=r21_x and r11.y<10) Q2<br>group by r11.x<br>having avg(r21 aggr y)>1; |
| 416 | select r11_x, avg(r21_aggr_y*r21_aggr_y+1)<br>from (select r11.x as r11_x, r21_aggr_y as r21_aggr_y<br>  from r11, (select r21.x as r21_x,<br>    avg(r21.y) as r21_aggr_y<br>    from r21 group by r21.x) v<br>  where r11.x=r21_x and r11.y<10) Q2<br>group by r11_x<br>having avg(r21_aggr_y)>1; |

At step 414, the columns of the second outer query block Q2 are set up in the SELECT list of the second outer query block Q2. In the working example, view columns r11.x as r11_x, r21_aggr_y as r21_aggr_y are set up. At step 416, the columns of the SELECT, GROUP BY, HAVING, and ORDER BY lists of the first outer query block Q1 are replaced to point to the set up columns in the second outer query block Q2. In the working example, the old r11.x column of the first outer query block Q1 is replaced to point to r11_x of the second outer query block Q2.

After applying the steps depicted in FIG. 4, the outer query block has been split into the first outer query block and the second outer query block. Only the first outer query block contains the GROUP BY clause and the HAVING clause of the original outer query block. The second outer query block, on the other hand, does not contain those clauses and, therefore, is ready for the application of the steps depicted in FIG. 3. TABLE 3 illustrates the result of applying the merging technique depicted in FIG. 3 in the working example.

TABLE 3

| Steps | Transformed Query |
|---|---|
| 300–336 | select r11_x, avg(r21_aggr_y*r21_aggr_y+1)<br>from (select r11.x as r11_x, avg(r21.y) as r21_aggr_y<br>  from r11, r21<br>  where r11.x=r21.x and r11.y<10<br>  group by r11.rowid, r11.x, r21.x) Q2<br>group by r11_x<br>having avg(r21 aggr y)>1; |

If the original query contains multiple nested blocks, then the steps depicted in FIGS. 3 and 4 are performed multiple times to complete the merging.

Merging Embedded Views With DISTINCT Qualifier

Another grouping operator is the DISTINCT qualifier for a query. The DISTINCT qualifier requires the database server to eliminate duplicates of matching rows that have the same values in a specified set of columns. According to one embodiment, a query with the DISTINCT qualifier is replaced by a semantically equivalent query with a GROUP BY operator and then transformed as described hereinabove. In particular, the following query with a DISTINCT qualifier:

select distinct CID from ORDERS; is semantically equivalent to the following query with a GROUP BY operator:

select CID from ORDERS group by CID; because both queries produce the same results, namely, eliminating row 636 whose CID of 2 is a duplicate of the CID in row 630. Therefore, according to this embodiment, the inner query block with a DISTINCT qualifier is first converted into a semantically equivalent query with a GROUP BY operator. The steps depicted in FIGS. 3 and 4 are then performed, as appropriate, to complete the transformation.

Figure 5:
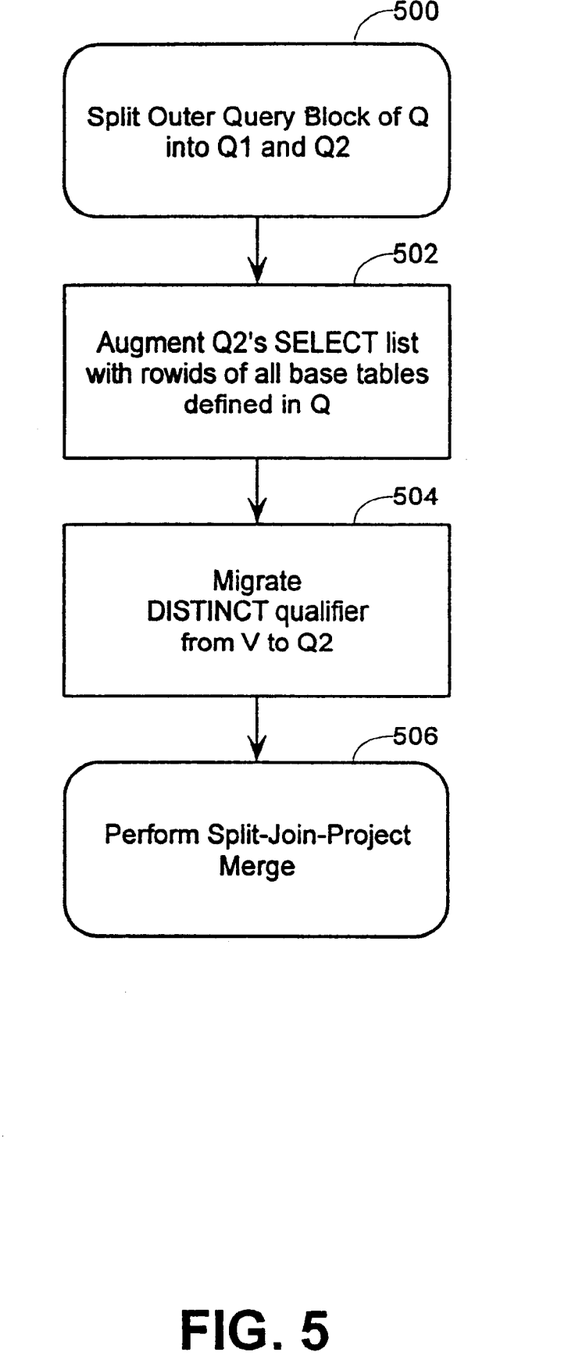
FIG. 5 is a flowchart illustrating the operation of a transformation for merging an inner query block with a DISTINCT operator according to an embodiment.

In another embodiment, a query with an inner query block with a DISTINCT qualifier is directly transformed by applying the steps depicted in FIG. 4, manipulating the resultant query, and then applying the SPJ merge transformation (depicted as steps 330–338 of FIG. 3). The operation of this embodiment will be illustrated with respect to the following query as a working example:

select v.x, r1.y
    from r1, (select distinct x, y, from r22 where x<>1) v
    where r1.x=v.x and r1.y=2;

Accordingly, the outer query block of the original query is first split into a first outer query block and a second outer query block. At step 500, a new query block Q2 with parts of the original outer query block is created and then merged into the first outer query block Q1. In the working example, this process results in the following query:

select r22_x, r1_y
    from (select r22.x as r22_x, r1.y as r1_y
      from r1, (select distinct x, y, from r22 where x<>1) v
    where r1.x=v.x and r1.y=2) Q2;

In step 502, the SELECT list of the second outer query block is augmented with the rowids of the base tables defined in the original outer query block. In the working example, this augmentation results in the following query:

select r22_x, r1_y
    from (select r22.x as r22_x, r1.y as r1_y, r1.rowid
      from r1, (select distinct x, y, from r22 where x<>1) v
    where r1.x=v.x and r1.y=2) Q2;

In step 504, the DISTINCT qualifier is migrated from the inner query block into the second outer query block. In the working example, this migration results in the following query:

select r22_x, r1_y
    from (select distinct r22.x as r22_x, r1.y as r1_y, r1.rowid
      from r1, (select x, y, from r22 where x<>1) v
    where r1.x=v.x and r1.y=2) Q2;

In step 506, the SPJ merge operation is applied by performing steps 330–336 depicted in FIG. 3. In the working example, the SPJ merge operation results in the following query:

```
select r22_x, r1_y
from (select distinct r22.x as r22_x, r1.y as r1_y,
    r1.rowid
    from r1, r22
    where r1.x=r22.x and r1.y=2 and r22.x<>1) Q2;
```
By inspection, it can be seen that the merged query is semantically equivalent to the original query, but the FROM clause of the merged query lists tables r1 and r22, originally found in separate query blocks.

Merging Embedded Subqueries

The techniques disclosed herein are also applicable when the original query contains an inner query block in the form of a non-correlated subquery used with the IN or NOT IN operators. A non-correlated subquery is an embedded query in a WHERE clause that does not refer to columns of another embedded query, such as a reference to a view. According to one embodiment, a query that contains a non-correlated subquery is replaced by a semantically equivalent query with a reference to a view and then transformed as described hereinabove. In particular, the following query with a non-correlated subquery:

```
select t1.x
from t1
where t1.y=1 and
    (t1.x, t1.y) in (select x, avg(y) from t2 group by x);
```
is semantically equivalent to the following query with a GROUP BY operator:

```
select t1.x
from t1, (select x, avg(y) as avg_y from t2 group by x) v
where t1.y=1 and t1.x=t2.x and t1.y=avg_y;
```
because both queries produce the same results. Therefore, according to this embodiment, the inner query block with a non-correlated subquery is first converted into a semantically equivalent query with a reference to a view. The steps depicted in FIGS. 3 and 4 are then performed, as appropriate, to complete the transformation. In the example, the result would be:

```
select t1.x
from t1, t2
where t1.y=1 and t1.x=t2.x and t1.y=avg(t2.y)
group by t2.x, t1.rowid;
```
By inspection, it can be seen that the merged query is semantically equivalent to the original query, but the FROM clause of the merged query lists tables r1 and r22, originally found in separate query blocks.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of processing a query in a database system, comprising the computer-implemented steps of:

receiving an original query that contains an inner query block with a grouping operator, said inner query block being embedded in an outer query block;

transforming the original query into a transformed query by: removing the inner query block from the original query, and merging portions of the inner query block into the outer query block; and processing the transformed query.

2. The method of claim 1, wherein the transformed query is semantically equivalent to the original query.

3. The method of claim 1, wherein the step of merging includes inserting table references from an inner query block FROM clause into an outer query block FROM clause.

4. The method of claim 3, wherein the inner query block includes a reference to a view.

5. The method of claim 4, wherein the grouping operator is an inner block GROUP BY clause, said inner block GROUP BY clause including expressions.

6. The method of claim 5, wherein the step of merging includes the step of inserting an outer block GROUP BY clause into the outer query block, said outer block GROUP BY clause based on the expressions of the inner block GROUP BY clause.

7. The method of claim 6, wherein the outer block GROUP BY further includes rowids of tables referenced in a FROM list of the outer query block.

8. The method of claim 6, wherein the step of transforming further includes the steps of:

inserting a HAVING clause into the outer query block, and moving a predicate of a WHERE clause of the outer query block into said HAVING clause, said predicate referencing a column in the view that is aggregated.

9. The method of claim 5, wherein the step of transforming includes the steps of:

splitting the outer query block into a first outer query block and a second outer query block, wherein the first outer query block encloses said second outer query block and includes a first outer query block GROUP BY or HAVING clause of the outer query block; and merging the inner query block into the second outer query block.

10. The method of claim 4, wherein the grouping operator includes an inner block DISTINCT qualifier for the view.

11. The method of claim 10, wherein the step of transforming includes the steps of:

splitting the outer query block into a first outer query block and a second outer query block, wherein:

the first outer query block encloses said second outer query block, the second outer query block includes a DISTINCT qualifier and contains a WHERE clause of the outer query block and;

migrating the DISTINCT qualifier from the inner query block to the second outer query block; and merging the inner query block into the second outer query block.

12. The method of claim 10, wherein the step of transforming includes converting the inner query block into an equivalent inner query block with a GROUP BY clause.

13. The method of claim 3, wherein the inner query block includes a subquery.

14. The method of claim 13, wherein the subquery is a non-correlated subquery.

15. The method of claim 14, wherein the step of transforming includes the step of converting the outer query block into an equivalent outer query block referencing a view based on the non-correlated subquery.

16. A computer-readable medium bearing instructions for processing a query in a database system, said instructions, when executed, arranged for causing one or more processors to perform the steps of:

receiving an original query that contains an inner query block with a grouping operator, said inner query block being embedded in an outer query block;

transforming the original query into a transformed query by: removing the inner query block from the original query, and merging portions of the inner query block into the outer query block; and processing the transformed query.

17. The computer-readable medium of claim 16, wherein the transformed query is semantically equivalent to the original query.

18. The computer-readable medium of claim 16, wherein the step of merging includes inserting table references from an inner query block FROM clause into an outer query block FROM clause.

19. The computer-readable medium of claim 18, wherein the inner query block includes a reference to a view.

20. The computer-readable medium of claim 19, wherein the grouping operator is an inner block GROUP BY clause, said inner block GROUP BY clause including expressions.

21. The computer-readable medium of claim 20, wherein the step of merging includes the step of inserting an outer block GROUP BY clause into the outer query block, said outer block GROUP BY clause based on the expressions of the inner block GROUP BY clause.

22. The computer-readable medium of claim 21, wherein the outer block GROUP BY further includes rowids of tables referenced in a FROM list of the outer query block.

23. The computer-readable medium of claim 21, wherein the step of transforming further includes the steps of:

inserting a HAVING clause into the outer query block, and moving a predicate of a WHERE clause of the outer query block into said HAVING clause, said predicate referencing a column in the view that is aggregated.

24. The computer-readable medium of claim 20, wherein the step of transforming includes the steps of:

splitting the outer query block into a first outer query block and a second outer query block, wherein the first outer query block encloses said second outer query block and includes a first outer query block GROUP BY or HAVING clause of the outer query block; and merging the inner query block into the second outer query block.

25. The computer-readable medium of claim 19, wherein the grouping operator includes an inner block DISTINCT qualifier for the view.

26. The computer-readable medium of claim 25, wherein the step of transforming includes the steps of:

splitting the outer query block into a first outer query block and a second outer query block, wherein: the first outer query block encloses said second outer query block, the second outer query block includes a DISTINCT qualifier and contains a WHERE clause of the outer query block and;

migrating the DISTINCT qualifier from the inner query block to the second outer query block; and merging the inner query block into the second outer query block.

27. The computer-readable medium of claim 25, wherein the step of transforming includes converting the inner query block into an equivalent inner query block with a GROUP BY clause.

28. The computer-readable medium of claim 18, wherein the inner query block includes a subquery.

29. The computer-readable medium of claim 28, wherein the subquery is a non-correlated subquery.

30. The computer-readable medium of claim 29, wherein the step of transforming includes the step of converting the outer query block into an equivalent outer query block referencing a view based on the non-correlated subquery.

* * * * *